US011456988B1

(12) United States Patent
Mereddy

(10) Patent No.: US 11,456,988 B1
(45) Date of Patent: Sep. 27, 2022

(54) MAP-T BORDER RELAY CONTROLLER

(71) Applicant: Charter Communications Operating, LLC, St. Louis, MO (US)

(72) Inventor: Sandeep Reddy Mereddy, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/345,447

(22) Filed: Jun. 11, 2021

(51) Int. Cl.
*G06F 15/16* (2006.01)
*H04L 61/251* (2022.01)
*H04L 61/2517* (2022.01)
*H04L 45/02* (2022.01)

(52) U.S. Cl.
CPC ............ *H04L 61/251* (2013.01); *H04L 45/02* (2013.01); *H04L 61/2517* (2013.01)

(58) Field of Classification Search
None
See application file for complete search history.

(56) References Cited

U.S. PATENT DOCUMENTS

| 7,792,963 | B2 | 9/2010 | Gould | |
|---|---|---|---|---|
| 2003/0056217 | A1 | 3/2003 | Brooks | |
| 2006/0130107 | A1 | 6/2006 | Gonder et al. | |
| 2007/0217436 | A1 | 9/2007 | Markley | |
| 2009/0248794 | A1 | 10/2009 | Helms | |
| 2010/0313236 | A1 | 12/2010 | Straub | |
| 2013/0094505 | A1* | 4/2013 | Sarikaya | H04L 45/741 370/390 |
| 2016/0014071 | A1* | 1/2016 | Asati | H04L 61/6063 709/245 |
| 2017/0012873 | A1* | 1/2017 | Berg | H04L 61/2557 |
| 2018/0191669 | A1* | 7/2018 | Barton | H04L 61/251 |
| 2022/0045983 | A1* | 2/2022 | Carter | H04L 61/2528 |
| 2022/0046116 | A1* | 2/2022 | Carter | H04L 61/251 |

OTHER PUBLICATIONS

X. Li et al., Mapping of Address and Port using Translation (MAP-T), Jul. 2015, pp. 1-27, Internet Engineering Task Force (IETF), Request for Comments: 7599.
C. Bao et al., IPv6 Addressing of IPv4/IPv6 Translators, Oct. 2010, pp. 1-18, Internet Engineering Task Force (IETF), Request for Comments: 6052.
Young Lee et al., Traffic Engineering and Service Mapping Yang Model, Mar. 5, 2019, pp. 1-29, Internet Engineering Task Force (IETF) Draft, draft-ietf-teas-te-service-mapping-yang-00.

\* cited by examiner

*Primary Examiner* — Phyllis A Book
(74) *Attorney, Agent, or Firm* — Otterstedt & Kammer PLLC

(57) ABSTRACT

A Mapping of Address and Port using Translation (MAP-T) border relay controller for managing and controlling a MAP-T network. Configuration and performance data are collected, by a border relay configuration collector, from one or more MAP-T border relay nodes of a MAP-T network. Internet Protocol (IP) flow data are collected, by an IP flow data collector, across one or more Internet peering routers coupled to the MAP-T network. A network anomaly that impairs performance of the MAP-T network is analyzed, by a logic algorithm module, using the configuration and performance data collected by the border relay configuration collector and the IP flow data collector. A network translation capability of the MAP-T network is reconfigured based on the analysis of the network anomaly and/or availability of network resources.

25 Claims, 15 Drawing Sheets

MAP-T BORDER RELAY CONTROLLER

FIELD OF THE INVENTION

The present invention relates generally to the electrical, electronic and computer arts, and, more particularly, to broadband networks and/or video content networks, and the like.

Background of the Invention

Address plus Port (A+P) is a mechanism that enables the sharing of IPv4 addresses by a plurality of users. The technique offers the advantage of stateless network address translation. Mapping of Address and Port (MAP) is a specification for A+P port address translation which enables the tunneling of IPv4 packets over an IPv6 network.

Mapping of Address and Port using Translation (MAP-T) is one of two transport modes of MAP. MAP-T provides IPv4/IPv6 stateless translation to support IPv4 connectivity over an IPv6 network. MAP-T enables the assignment of an IP address to multiple customers, where the customers are distinguished by different port numbers, and supports N:1 IPv4 address sharing by assigning a public IPv4 address (logically) with a unique set of layer-4 ports to, for example, a subscriber router.

SUMMARY OF THE INVENTION

Principles of the invention provide techniques for a MAP-T border relay controller. In one aspect, an exemplary method includes operations of collecting, by a border relay configuration collector, configuration and performance data from one or more MAP-T border relay nodes of a MAP-T network; collecting, by an IP flow data collector, IP flow data across one or more Internet peering routers coupled to the MAP-T network; analyzing, by a logic algorithm module, a network anomaly that impairs performance of the MAP-T network using the configuration and performance data collected by the border relay configuration collector and the IP flow data collector; and reconfiguring a network translation capability of the MAP-T network based on the analysis of the network anomaly.

In another aspect, an exemplary method includes operations of collecting, by a border relay configuration collector, configuration and performance data from one or more MAP-T border relay nodes of a MAP-T network; collecting, by an IP flow data collector, IP flow data across one or more Internet peering routers coupled to the MAP-T network; determining, by a logic algorithm module, an availability of network resources for the MAP-T network using the configuration and performance data collected by the border relay configuration collector and the IP flow data collector, the network resources comprising one or more available port assignments corresponding to a given IP address; and reconfiguring a network translation capability of the MAP-T network based on the determined availability of network resources.

In still another aspect, a system comprises a border relay configuration collector configured to collect configuration and performance data from one or more MAP-T border relay nodes of a MAP-T network; an IP flow data collector configured to collect IP flow data across one or more Internet peering routers coupled to the MAP-T network; a logic algorithm module coupled to the border relay configuration collector and the IP flow data collector and configured to analyze a network anomaly that impairs performance of the MAP-T network using the configuration and performance data collected by the border relay configuration collector and the IP flow data collector; and a graphical user interface module coupled to the logic algorithm module and configured to receive instructions to reconfigure a network translation capability of the MAP-T network based on the analysis of the network anomaly.

In yet another aspect, a non-transitory computer readable medium comprises computer executable instructions which when executed by a computer cause the computer to perform the method of collecting, by a border relay configuration collector, configuration and performance data from one or more MAP-T border relay nodes of a MAP-T network; collecting, by an IP flow data collector, IP flow data across one or more Internet peering routers coupled to the MAP-T network; analyzing, by a logic algorithm module, a network anomaly that impairs performance of the MAP-T network using the configuration and performance data collected by the border relay configuration collector and the IP flow data collector; and reconfiguring a network translation capability of the MAP-T network based on the analysis of the network anomaly.

In a further aspect, a non-transitory computer readable medium comprises computer executable instructions which when executed by a computer cause the computer to perform the method of collecting, by a border relay configuration collector, configuration and performance data from one or more MAP-T border relay nodes of a MAP-T network; collecting, by an IP flow data collector, IP flow data across one or more Internet peering routers coupled to the MAP-T network; determining, by a logic algorithm module, an availability of network resources for the MAP-T network using the configuration and performance data collected by the border relay configuration collector and the IP flow data collector, the network resources comprising one or more available port assignments corresponding to a given IP address; and reconfiguring a network translation capability of the MAP-T network based on the determined availability of network resources.

In a still further aspect, an exemplary system includes a border relay configuration collector configured to collect configuration and performance data from one or more MAP-T border relay nodes of a MAP-T network; an IP flow data collector configured to collect IP flow data across one or more Internet peering routers coupled to the MAP-T network; and a logic algorithm module coupled to the border relay configuration collector and the IP flow data collector and configured to determine availability of network resources for the MAP-T network using the configuration and performance data collected by the border relay configuration collector and the IP flow data collector. The network resources include one or more available port assignments corresponding to a given IP address. Also included is a graphical user interface module coupled to the logic algorithm module and configured to receive instructions to reconfigure a network translation capability of the MAP-T network based on the determined availability of network resources.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a MAP-T border relay controller) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. Some or all of the compute functions described herein can also be virtualized and located in the cloud.

Aspects of the present invention can provide substantial beneficial technical effects. For example, one or more embodiments of the invention achieve one or more of:
- monitoring of the performance of MAP-based networks;
- management of MAP-T resources;
- detection and mitigation of MAP-T configuration errors;
- avoidance of truck rolls (i.e., the dispatching of a service technician) for customer premises equipment (CPE) troubleshooting (since configuration problems are identified remotely);
- detection of performance issues via a "single pane of glass" graphical user interface (GUI) configured for monitoring MAP-T customer flow translations at the CPE and border relay nodes, and for monitoring traffic transiting other network devices;
- GUI view of host Internet Protocol (IP) port utilizations for MAP-T translations and the like;
- improvement in the technological process of operating and maintaining a cable/fiber broadband communications network (broadband cable fiber is used herein to refer to a primarily wired network using coaxial cable and/or fiber optic cable, such as shown in FIGS. 1-9); and
- forecasting of future average customer port utilization needs.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Figure 1:
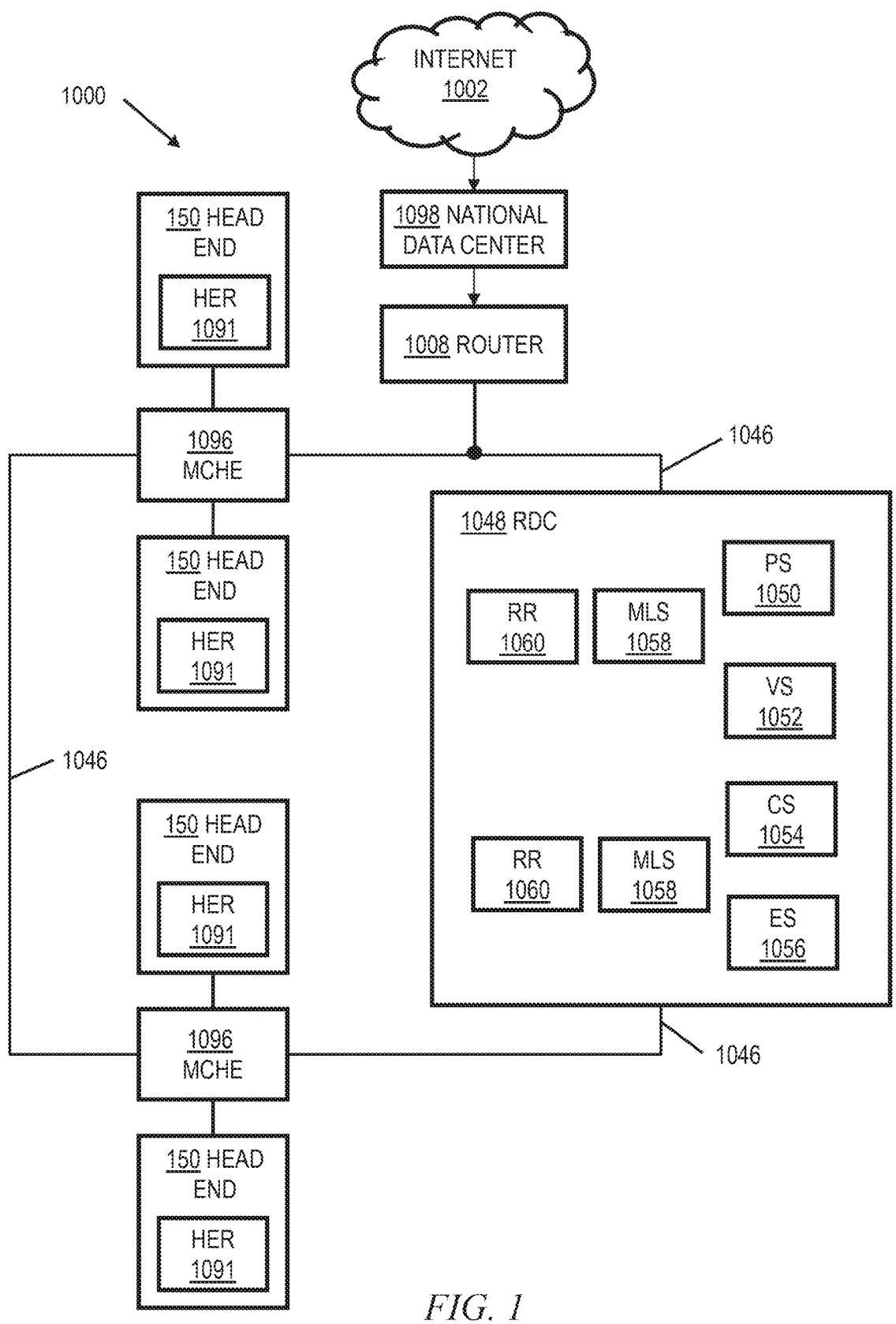
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IPxtransfer control protocol/ Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
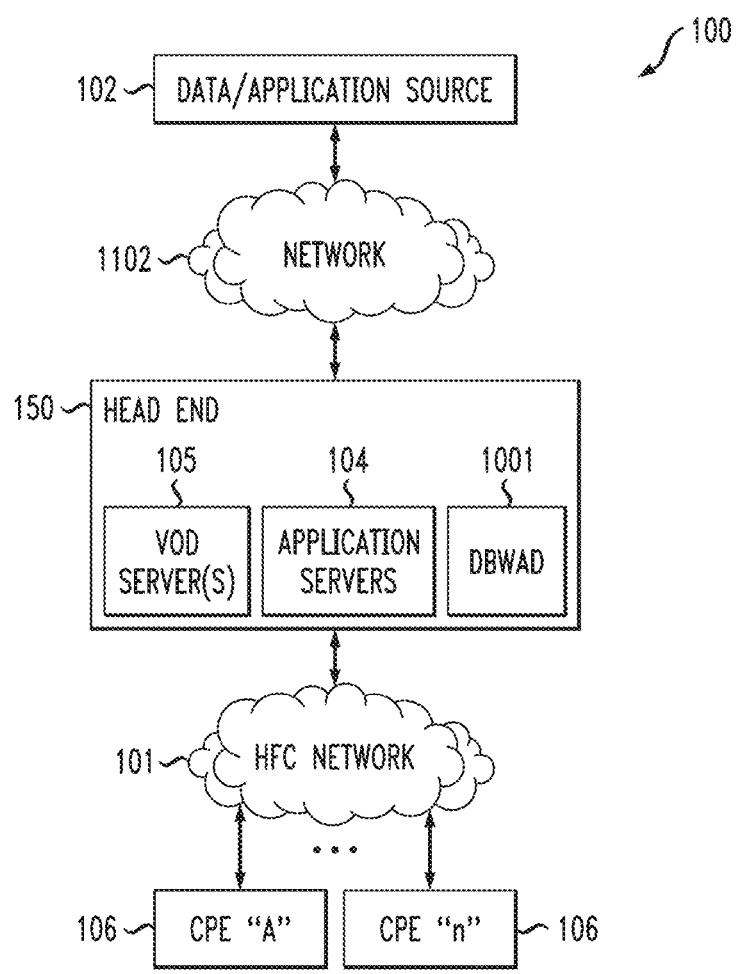
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUs (S-ONUs; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g., FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
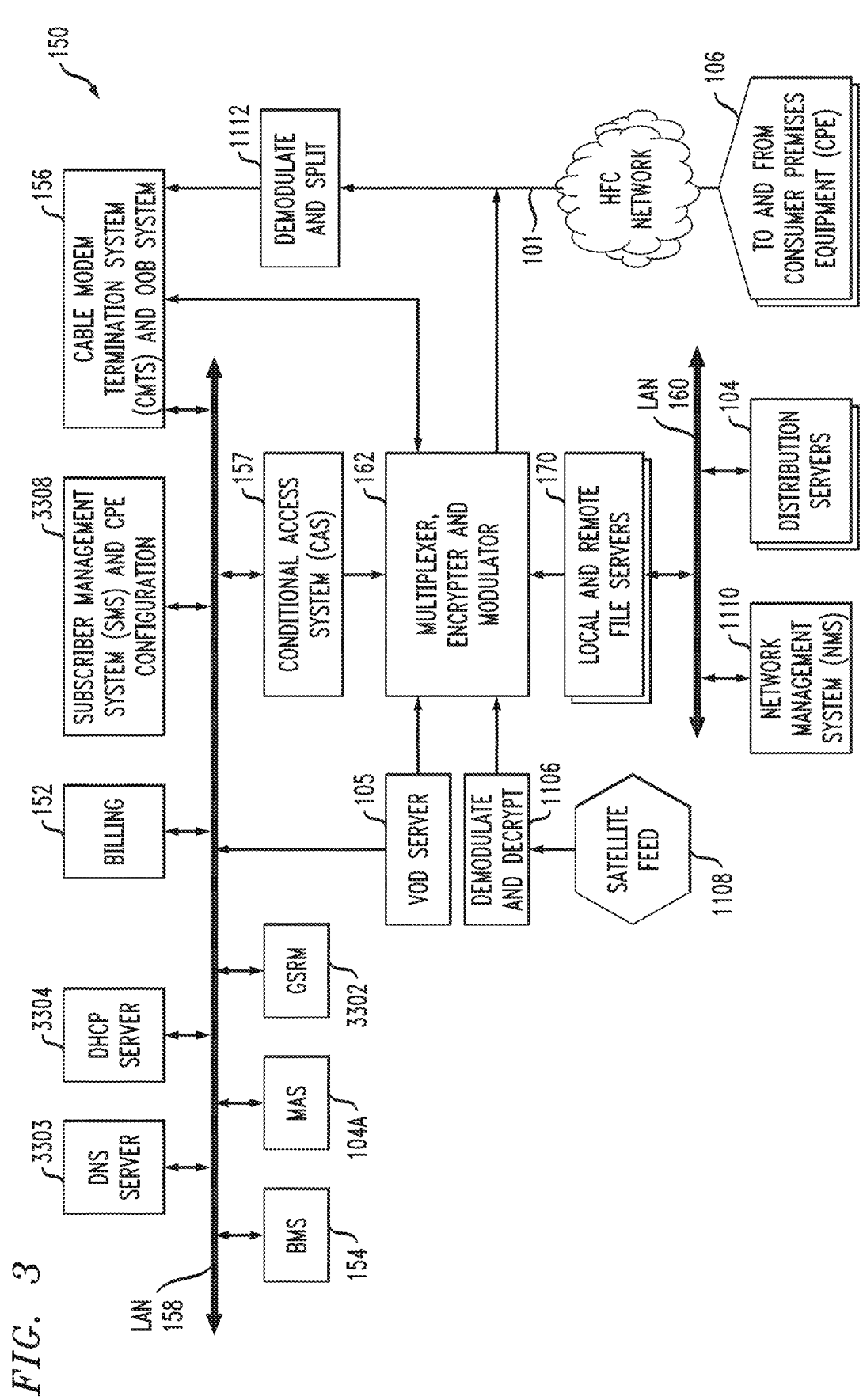
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NET- WORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville CO 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

It should be noted that the exemplary architecture in FIG. 3 shows a traditional location for the CMTS 156 in a head end. As will be appreciated by the skilled artisan, CMTS functionality can be moved down closer to the customers or up to a national or regional data center or can be dispersed into one or more locations.

Figure 4:
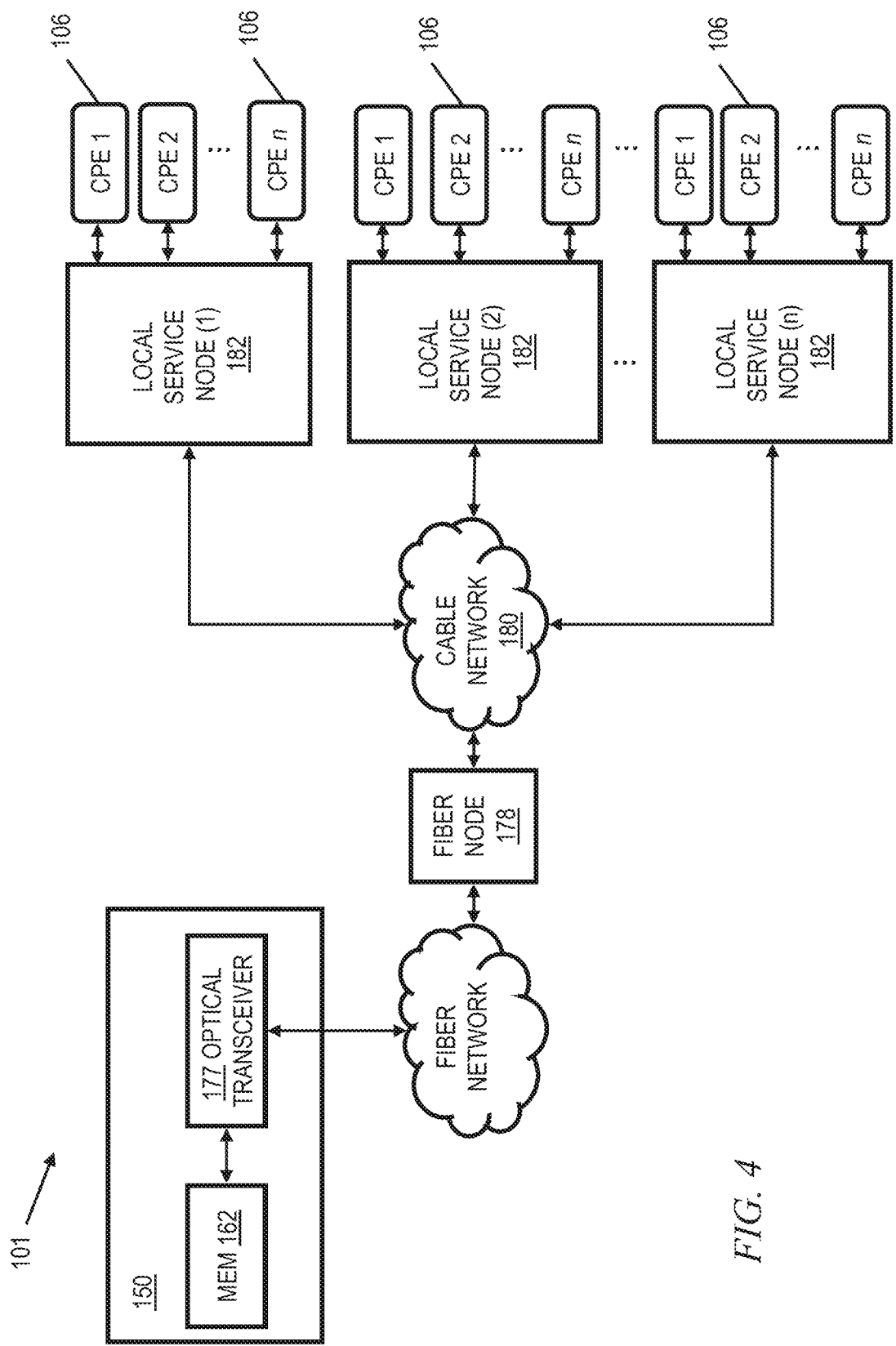
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
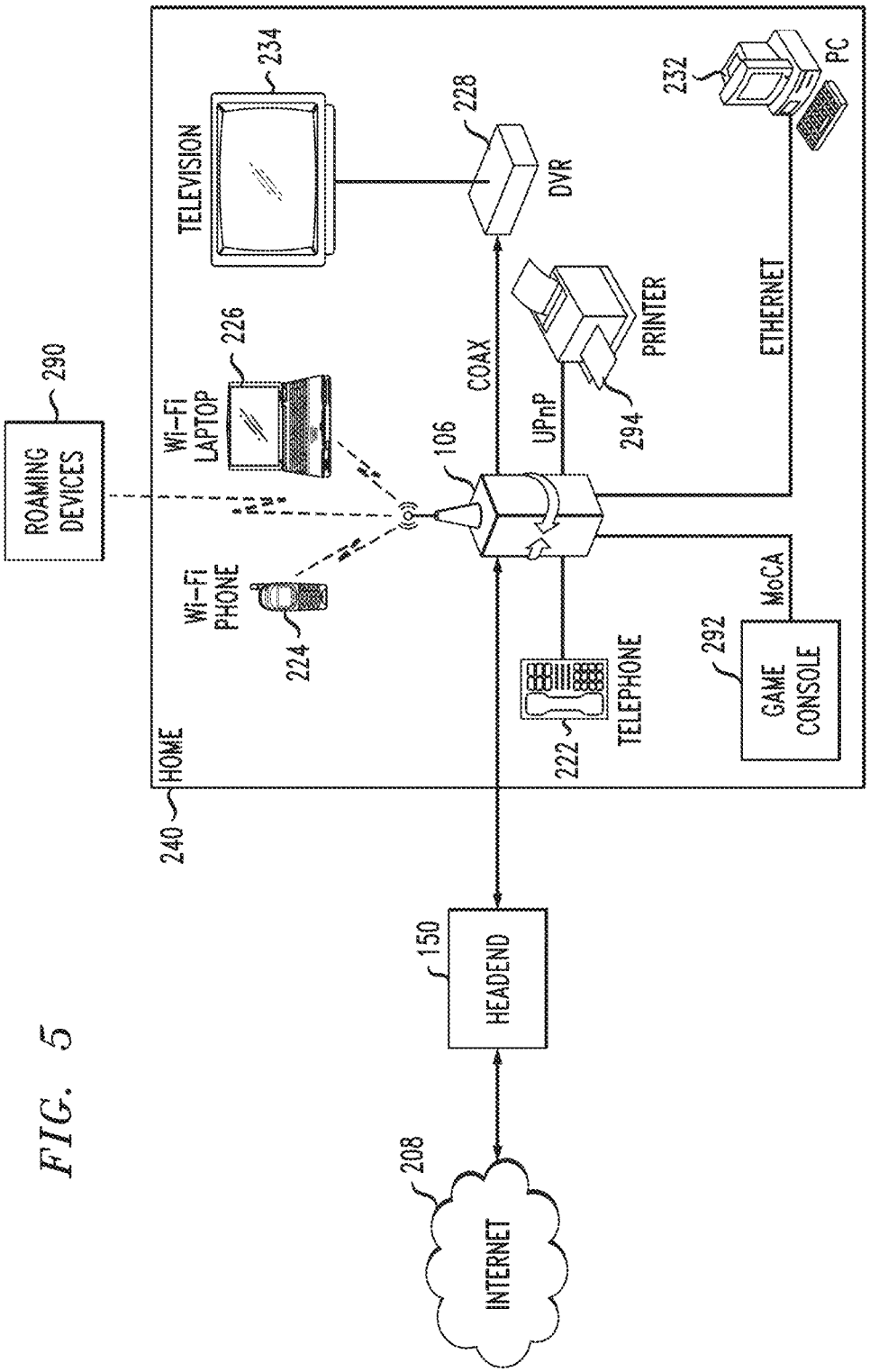
FIG. 5 is a functional block diagram of a premises network, including an exemplary centralized customer premises equipment (CPE) unit, interfacing with a head end such as that of FIG. 3.
Figure 6:
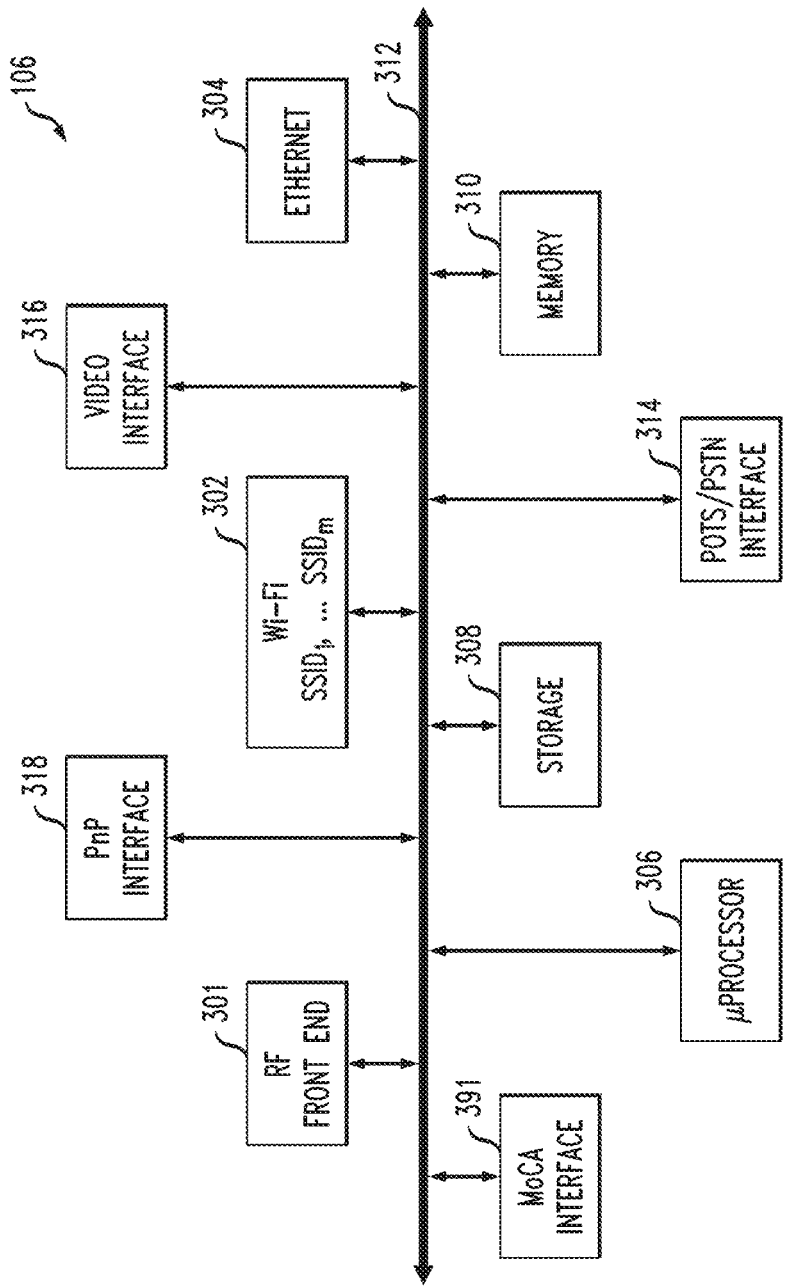
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g., the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g., Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
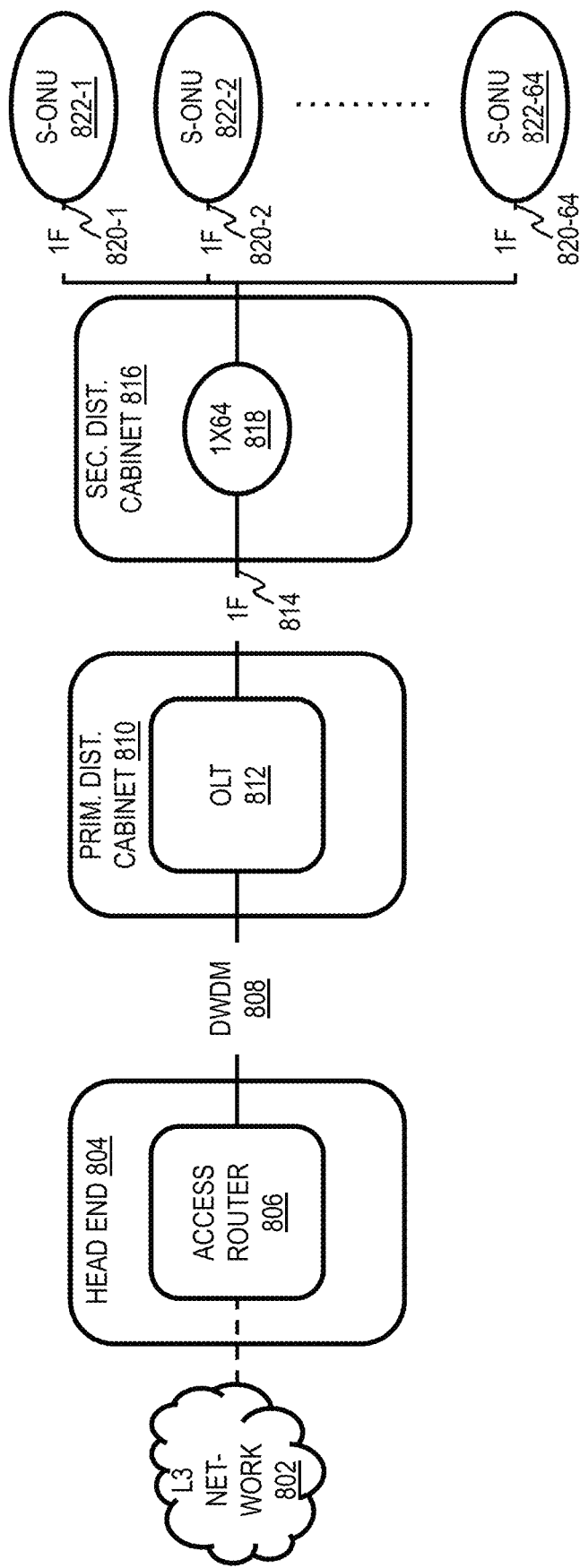
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 1802 generally represents the elements in FIG. 1 upstream of the head ends 150, while head end 1804, including access router 1806, is an alternative form of head end that can be used in lieu of or in addition to head ends 150 in one or more embodiments. Head end 1804 is suitable for FTTH implementations. Access router 1806 of head end 1804 is coupled to optical line terminal 1812 in primary distribution cabinet 1810 via dense wavelength division multiplexing (DWDM) network 1808. Single fiber coupling 1814 is then provided to a 1:64 splitter 1818 in secondary distribution cabinet 1816 which provides a 64:1 expansion to sixty-four S-ONUs 1822-1 through 1822-64 (in multiple premises) via sixty-four single fibers 1820-1 through 1820-64, it being understood that a different ratio splitter could be used in other embodiments and/or that not all of the 64 (or other number of) outlet ports are necessarily connected to an S-ONU.

Figure 9:
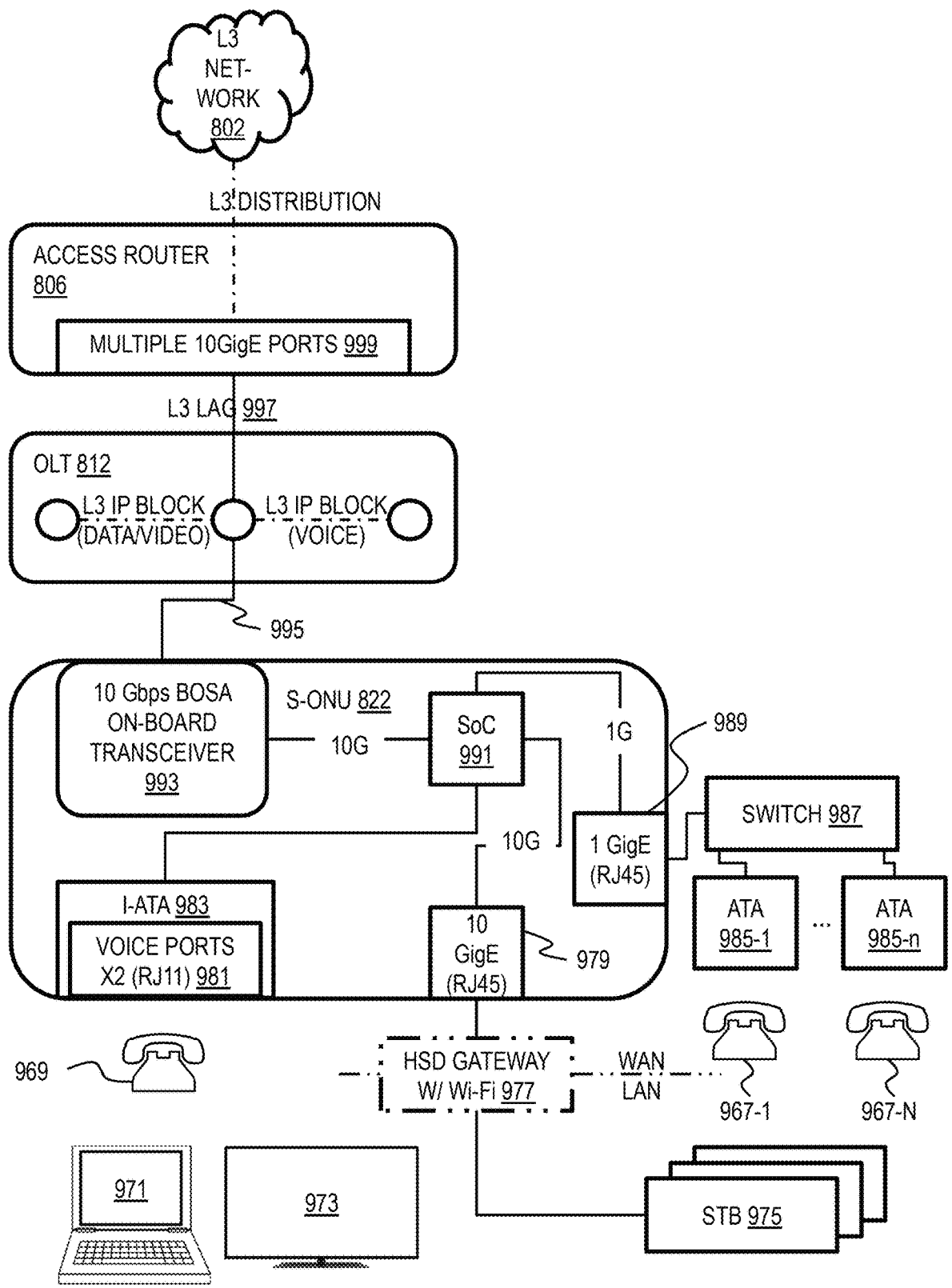
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 1806 is provided with multiple ten-Gigabit Ethernet ports 1999 and is coupled to OLT 1812 via L3 (layer 3) link aggregation group (LAG) 1997. OLT 1812 can include an L3 IP block for data and video, and another L3 IP block for voice, for example. In a non-limiting example, S-ONU 1822 includes a 10 Gbps bi-directional optical subassembly (BOSA) on-board transceiver 1993 with a 10G connection to system-on-chip (SoC) 1991. SoC 1991 is coupled to a 10 Gigabit Ethernet RJ45 port 1979, to which a high-speed data gateway 1977 with Wi-Fi capability is connected via category 5E cable. Gateway 1977 is coupled to one or more set-top boxes 1975 via category 5e, and effectively serves as a wide area network (WAN) to local area network (LAN) gateway. Wireless and/or wired connections can be provided to devices such as laptops 1971, televisions 1973, and the like, in a known manner. Appropriate telephonic capability can be provided. In a non-limiting example, residential customers are provided with an internal integrated voice gateway (I-ATA or internal analog telephone adapter) 1983 coupled to SoC 1991, with two RJ11 voice ports 1981 to which up to two analog telephones 1969 can be connected. Furthermore, in a non-limiting example, business customers are further provided with a 1 Gigabit Ethernet RJ45 port 1989 coupled to SoC 1991, to which switch 1987 is coupled via Category 5e cable. Switch 1987 provides connectivity for a desired number n (typically more than two) of analog telephones 1967-1 through 1967-n, suitable for the needs of the business, via external analog telephone adapters (ATAs) 1985-1 through 1985-n. The parameter "n" in FIG. 9 is not necessarily the same as the parameter "n" in other figures, but rather generally represents a desired number of units. Connection 1995 can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Principles of the present disclosure will be described herein in the context of a MAP-T border relay controller 1204; indeed, of apparatus, systems, and methods for monitoring, managing, diagnosing, and configuring MAP-T networks. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

MAP-T provides IPv4/IPv6 stateless translation to support IPv4 connectivity over an IPv6 network. See Internet Engineering Task Force (IETF) Request for Comments 7599, entitled "Mapping of Address and Port using Translation (MAP-T)" July 2015, hereby expressly incorporated by reference herein in its entirety for all purposes. MAP-T supports N:1 IPv4 address sharing by assigning a public IPv4 address (logically) with a unique set of layer-4 ports to, for example, a subscriber router, and thereby enables the assignment of an IP address to multiple customers (where the customers are distinguished by different port numbers).

In one example embodiment, Map-T allocates one public IP address to multiple (such as 8, 16, etc.) customers and each customer is assigned a set of ports corresponding to the given public IP address. The port assignments enable clients sharing an IP address to be distinguished from each other. It is noted that the cited MAP-T translation techniques are stateless and that, prior to transmission of the packet from the CPE 106, a v4-to-v4 translation is performed.

Figure 10A:
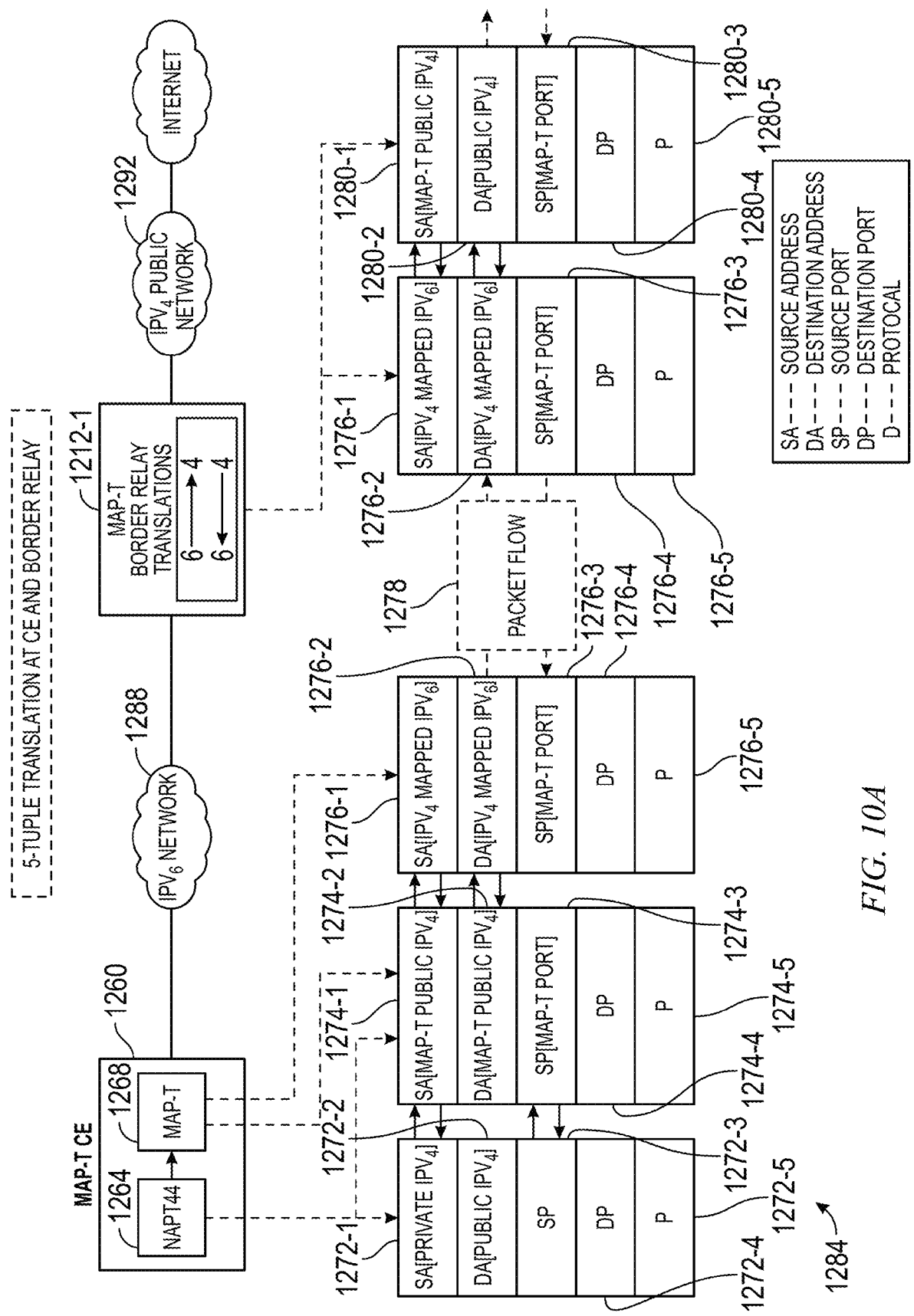
FIG. 10A is a high-level block diagram of an example MAP-T network, in accordance with an example embodiment.

FIG. 10A is a high-level block diagram of a MAP-T network, in accordance with an example embodiment. In the example embodiment, a packet header 1284 containing a private source address 1272-1 is subjected to IPv4-to-IPv4 translation 1264 followed by an IPv4 to IPv6 translation 1268 within Map-T customer equipment 1260.

In one example embodiment, the address mapping is performed in accordance with the MAP-T Default Mapping Rule (DMR) of RFC 7599. IPv4 packets sent by MAP nodes in one MAP domain are translated to IPv6 using the sender's MAP IPv6 address as the IPv6 source address, in accordance with the Basic Mapping Rule (BMR) of RFC 7599. The Forwarding Mapping Rule (FMR) of RFC 7599 specifies the recipient's MAP IPv6 address as the IPv6 destination address. IPv4 destinations outside the MAP domain utilize IPv4-embedded IPv6 addresses according to RFC6052. See Internet Engineering Task Force (IETF) Request for Comments 6052, entitled "IPv6 Addressing of IPv4/IPv6 Translators" October 2010, hereby expressly incorporated by reference herein in its entirety for all purposes. Thus, the source address of the IPv6 packet is that of the MAP IPv6 address of the customer premises equipment and the destination IPv6 address is the destination IPv4-embedded IPv6 address.

As illustrated in FIG. 10A, the private source address 1272-1 and a corresponding source port 1272-3 are mapped to a MAP-T public IPv4 source address 1274-1 and a corresponding MAP-T source port 1274-3, respectively. The MAP-T public IPv4 source address 1274-1 is mapped to a MAP-T public IPv4 over IPv6 source address 1276-1 while the MAP-T source port 1274-3 is maintained unchanged as the MAP-T source port 1276-3. In addition, a public IPv4 destination address 1272-2, 1274-2 of the packet header 1284 is not changed, but is encapsulated in an IPv6 packet as a public IPv4 over IPv6 destination address 1276-2. Similarly, a destination port 1272-4 and a protocol indicator 1272-5 are maintained during the IPv4-to-IPv4 translation 1264 and the IPv4 to IPv6 translation 1268 as destination port 1274-4, 1276-4 and protocol indicator 1274-5, 1276-5.

Following the IPv4-to-IPv4 translation 1264 and the IPv4 to IPv6 translation 1268, the packet flow 1278 is transmitted over an IPv6 network 1288 to a Border Relay node 1212-1, where the MAP-T public IPv4 over IPv6 source address 1276-1 is extracted and exchanged (mapped to) to a MAP-T public IPv4 source address 1280-1. Similarly, the public v4 over v6 destination address 1276-2 is extracted and converted back to the public v4 destination address 1280-2. It is noted that the MAP-T source port 1276-3, the destination port 1276-4, and the protocol indicator 1276-5 are extracted and maintained as the MAP-T source port 1280-3, the destination port 1280-4, and the protocol indicator 1280-5.

It is noted that the Border Relay node 1212-1 is able to perform the extraction and exchange in a stateless manner. The Border Relay node 1212-1 simply examines the map relay rules and extracts the IPv4 addresses based on the IPv6 and IPv4 prefixes. Thus, the Border Relay node 1212-1 extracts the MAP-T public IPv4 source address 1274-1 from the IPv6 packet and maps it to MAP-T public IPv4 source address 1280-1 while the MAP-T source port 1274-3 is extracted from the IPv6 packet and remains unchanged as the MAP-T source port 1280-3. The public IPv4 destination address 1274-2 is extracted from the IPv6 packet and remains unchanged as public IPv4 destination address 1280-2.

The current assignment of ports, the availability of ports for assignment, the performance of network connections that utilize the MAP-T translation, and the like are, however, often opaque to network users, administrators, and similar individuals. This lack of information impedes the monitoring, management and diagnosis of MAP-based networks. In one example embodiment, a network tool enables the monitoring of MAP-T border relay-based network configurations and network performance, the management of network resources and configurations, and the diagnosis of network anomalies. For example, the network tool enables the observation of IPv4 utilization per prefix, IPv4 utilization per customer host IP address, and the like. In one example embodiment, the network tool enables the monitoring of different IPv4 packet types traveling from the Internet towards the Border Relay Router for a given MAP-T customer.

Figure 10B:
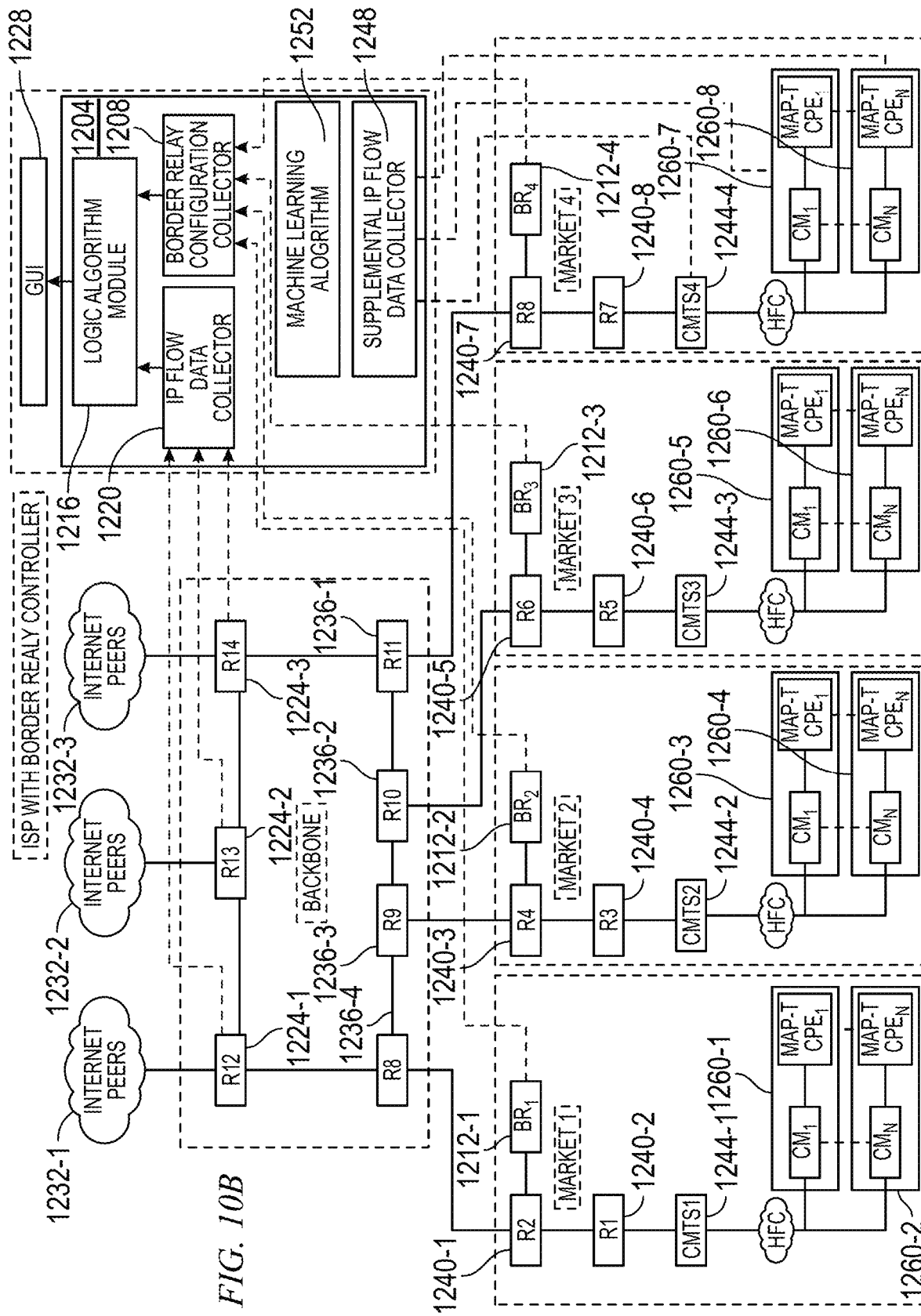
FIG. 10B is a mid-level block diagram of an example MAP-T network, in accordance with an example embodiment.

FIG. 10B is a mid-level block diagram of an example MAP-T network, in accordance with an example embodiment. The IPv6 network 1288 of FIG. 10A corresponds to, for example, CMTS 1244-4, router 1240-8, and router 1240-7. The IPv4 network 1292 of FIG. 10A corresponds to, for example, router 1236-1 and the Internet peering router 1224-3. In the exemplary embodiment, a border relay configuration collector 1208 collects configuration and performance data from MAP-T Border Relay (BR) nodes 1212-1, 1212-2, 1212-3, 1212-4 and other network devices, based on MAP-T Domain rules, embedded addresses (EAs), port-set identifier (PSID) information, and the like. In one example embodiment, the border relay configuration collector 1208 is implemented as a Python program that interacts with the MAP-T Border Relay (BR) nodes 1212-1, 1212-2, 1212-3, 1212-4 and takes a snapshot of the configuration of the MAP-T Border Relay (BR) nodes 1212-1, 1212-2, 1212-3, 1212-4. The configuration information is obtained, for example, every few (e.g., three) seconds or other suitable period (e.g., ten seconds, five minutes). The information may be collected using the Secure Shell (SSH) protocol and software, NETCONF, an Application Programming Interface (API), and/or operational and configuration models, such as Yang models (e.g., Young Lee et al., Traffic Engineering and Service Mapping Yang Model, IETF Internet Draft Mar. 5, 2019, expressly incorporated herein by reference in its entirety for all purposes), which may be defined for each MAP-T Border Relay (BR) node 1212-1, 1212-2, 1212-3, 1212-4. A logic algorithm module 1216 uses this information to visually provide, for example, per-IP and per-customer allocation information and to filter IP flow data collected by an IP flow data collector 1220, as described more fully below in conjunction with FIG. 12 (Module 1216 implements the algorithm in FIG. 12 using software executing on a hardware processor, for example). For example, the IP flow data collector 1220 filters packets based on the IP source address(es) provided by the Border Relay nodes 1212-1, 1212-2, 1212-3, 1212-4 to access packets that are associated with IPv4 connectivity over an IPv6 network. The IP flow data is operational data collected across all Internet peering routers 1224-1, 1224-2, 1224-3 (which provide connectivity for Internet peers 1232-1, 1232-2, 1232-3) to provide per host utilization. In one example embodiment, the IP flow data collector 1220 additionally collects IP flow data from routers other than the Internet peering routers 1224-1, 1224-2, 1224-3 such as backbone routers 1236-1, 1236-2, 1236-3, 1236-4, routers 1240-1, 1240-2, 1240-3,

1240-4, 1240-5, 1240-6, 1240-7, 1240-8, and MAP-T Border Relay (BR) nodes 1212-1, 1212-2, 1212-3, 1212-4, and the like. The network tool also provides information regarding different IPv4 traffic types coming from the Internet to Border Relay nodes 1212-1, 1212-2, 1212-3, 1212-4.

In one example embodiment, a supplemental IP flow data collector 1248 collects IP flow information from customer premises equipment and cable-modem termination systems, such as Map-T customer equipment 1260-1, 1260-2, 1260-3, 1260-4, 1260-5, 1260-6, 1260-7, 1260-8 and CMTS 1244-1, 1244-2, 1244-3, 1244-4. The cited flow data is used, for example, to diagnose the cause of lost connections, as described further below in connection with Use Case #2. Moreover, a machine learning prediction algorithm 1252 analyzes data collected by the IP flow data collector 1220 and the border relay configuration collector 1208 to, for example, predict the future port utilization by the Map-T customer equipment 1260-7, 1260-8 for use in capacity planning and network management. In one example embodiment, a machine learning prediction algorithm (such as the supervised machine learning algorithm 1252) is trained on corpora of historic port utilization information, current port utilization information, and the like to, for example, recognize trends in the usage of source ports. Following training, the supervised machine learning algorithm 1252 (e.g., during inferencing using the trained model) provides recommendations and/or assists in the automatic execution of capacity planning and the forecasting of future utilization of, for example, customer source ports. In one example embodiment, the machine learning prediction algorithm 1252 is implemented using a neural network. In one example embodiment, the IP flow data collector 1220 is implemented using a NetFlow data collector where, for example, the routers 1240-1, 1240-2, 1240-3, 1240-4, 1240-5, 1240-6, 1240-7, 1240-8 are configured to send operational data to the IP flow data collector 1220 via a specified port. In one example embodiment, the supplemental IP flow data collector 1248 is implemented using a NetFlow data collector where, for example, each CMTS 1244-1, 1244-2, 1244-3, 1244-4 is configured to send operational data to the supplemental IP flow data collector 1248 via a specified port. Simple Network Management Protocol (SNMP) can be used for collection in one or more embodiments. The skilled artisan, given the teachings herein, can write a program to collect data from one or more ports based on known techniques.

In one example embodiment, the network tool includes a graphical user interface (GUI) 1228 and/or interfaces with a GUI 1228 that provides an indication of the IPv4 utilization per prefix, the IPv4 utilization per customer, MAP-T host IP addresses with source port range information, and the like. The GUI 1228 provides information about different traffic flows traveling from the Internet to the border relay nodes 1212-1, 1212-2, 1212-3, 1212-4, which is useful in understanding the different traffic types destined for residential customers. In one example embodiment, the GUI 1228 is constructed using known techniques, such as hypertext markup language, for generating graphical user interfaces for display in a browser, such as the interfaces described below in conjunction with FIG. 11.

Figure 11:
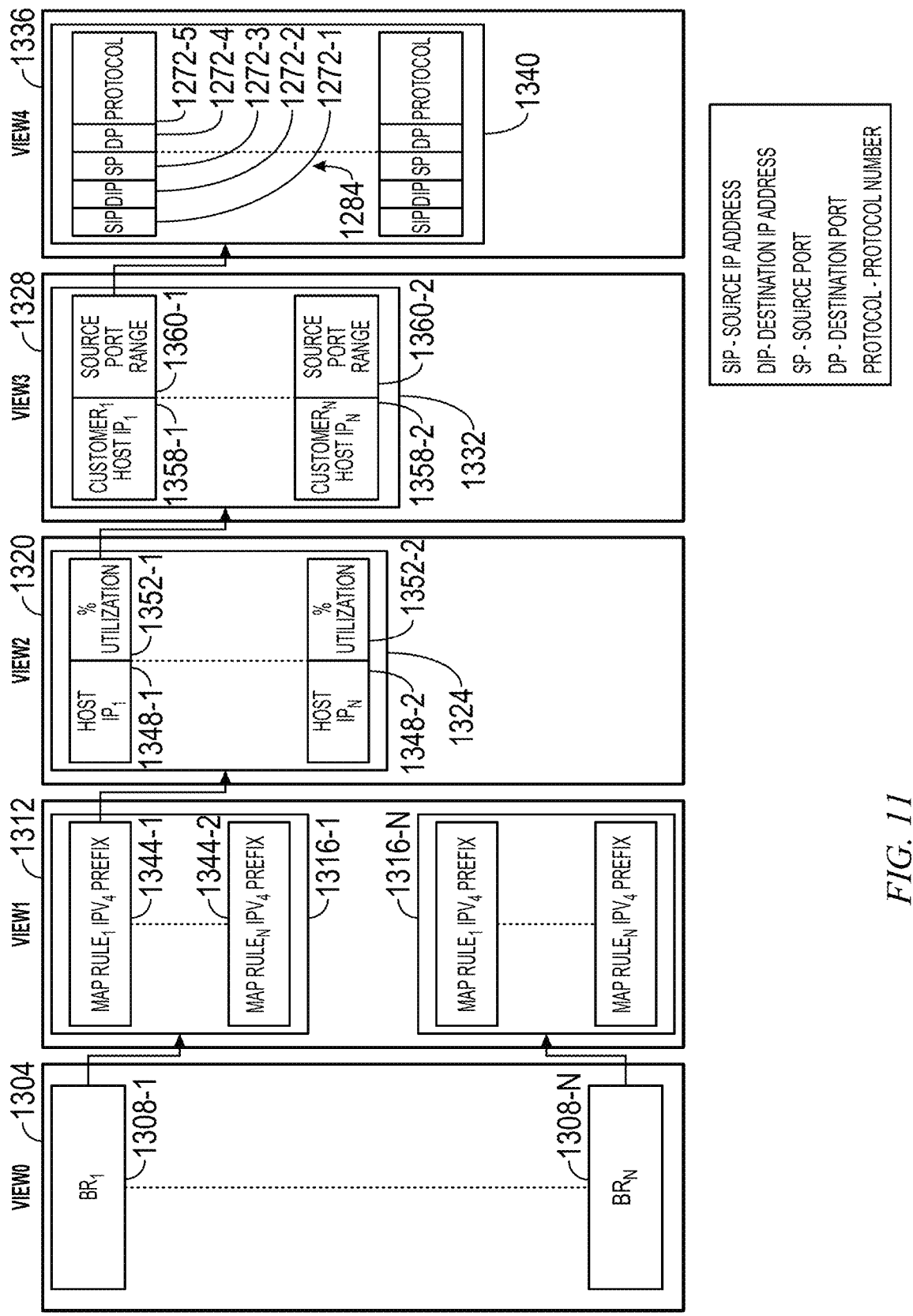
FIG. 11 is an illustration of example interfaces of an example GUI, in accordance with an example embodiment.

FIG. 11 is an illustration of example interfaces of an example GUI 1228 (in FIG. 10B), in accordance with an example embodiment. In the exemplary embodiment, the GUI 1228 generates interfaces view0 1304, view1 1312, view2 1320, view3 1328, and view4 1336. View0 1304 presents a set of border relay icons 1308-1, . . . , 1308-N, where each border relay icon 1308-1, . . . , 1308-N represents a corresponding Border Relay node 1212-1, 1212-2, 1212-3, 1212-4. View1 1312 displays detailed border relay icons 1316-1, . . . , 1316-N that present details, such as the corresponding map relay rules 1344-1, 1344-2, for each Border Relay node 1212-1, 1212-2, 1212-3, 1212-4. Selection of one of the rules 1344-1, 1344-2 presented in one of the detailed border relay icons 1316-1, . . . , 1316-N triggers display of view2 1320 where, for example, the details of the selected rule 1344-1, 1344-2 are displayed. For example, each host IP address 1348-1, 1348-2 corresponding to the selected rule 1344-1 is displayed along with its utilization 1352-1, 1352-2 in a set of host icons 1324. In one example embodiment, the utilization parameter 1352-1 is the percentage of ports assigned to the Map-T customer equipment 1260-7.

In one example embodiment, selection of one of the host IP addresses 1348-1, 1348-2 of the set of host icons 1324 triggers display of view3 1328 where, for example, the source port range 1360-1, 1360-2 corresponding to the selected host IP address 1358-1, 1358-2 is displayed in a set of customer-port icons 1332. Similarly, selection of one of the customer host IP addresses 1358-1, 1358-2 of the set of customer-port icons 1332 triggers display of view4 1336 where, for example, metadata describing the customer traffic flow, such as packet header 1284, that corresponds to the selected customer is displayed in a traffic flow icon 1340. In one example embodiment, the traffic flow icon 1340 displays the private source address 1272-1, the public IPv4 destination address 1272-2, the source port 1272-3, the destination port 1272-4, and the protocol indicator 1272-5 for each packet header 1284 of the customer traffic flow. The metadata may be used, for example, to identify the location where customer traffic flow is erroneously interrupted, such as in an improperly configured Border Relay node 1212-1, 1212-2, 1212-3, 1212-4.

Figure 12:
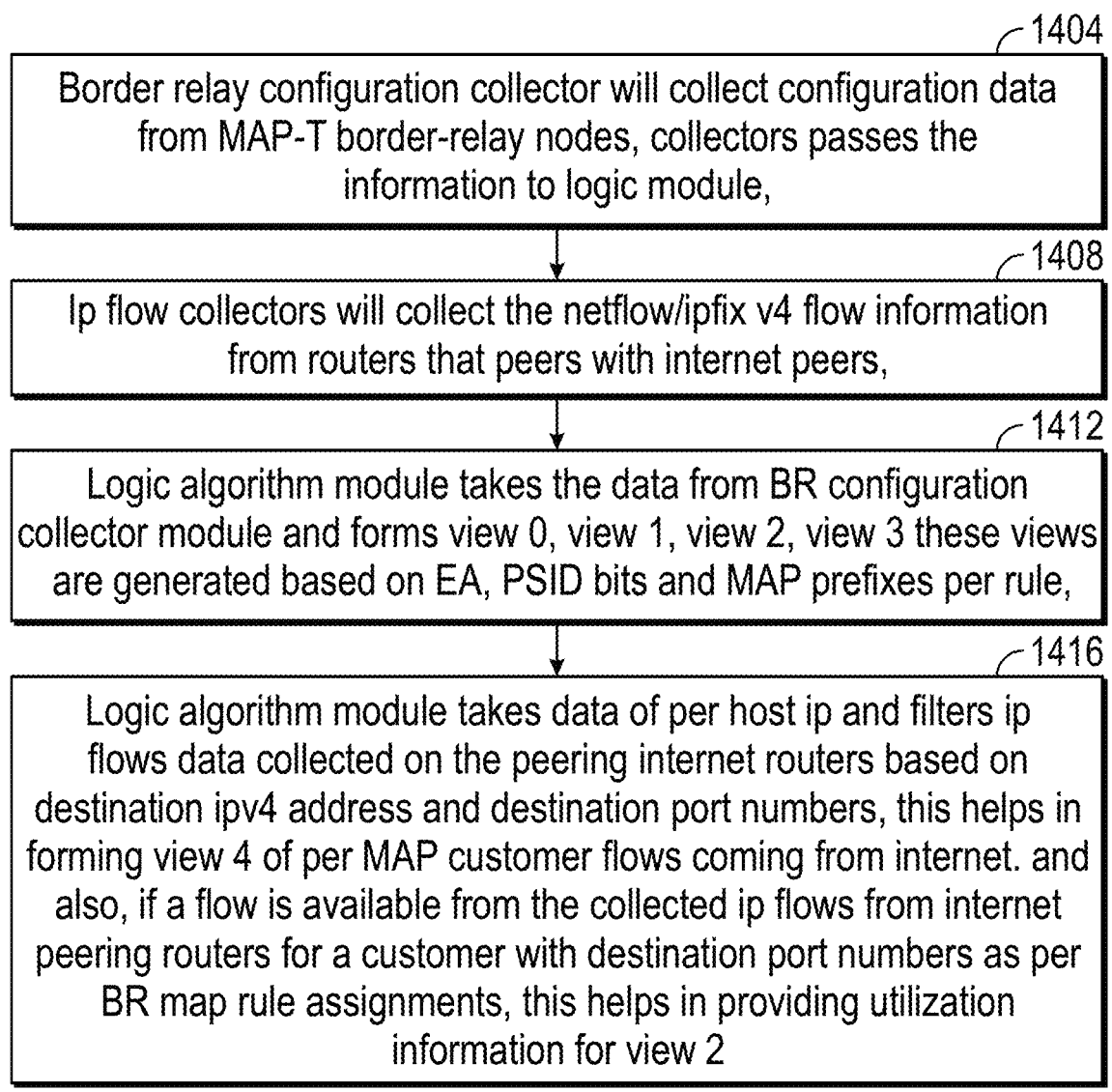
FIG. 12 is a flowchart for an example method for monitoring, managing, diagnosing, and configuring a MAP-based network, in accordance with an example embodiment.

FIG. 12 is a flowchart for an example method for monitoring, managing, diagnosing, and configuring a MAP-based network, in accordance with an example embodiment. In one example embodiment, the Border Relay configuration collector 1208 collects configuration data from Border Relay nodes 1212-1, 1212-2, 1212-3, 1212-4 and passes the information to the logic algorithm module 1216 (operation 1404). The IP flow data collector 1220 collects netflow/ipfix V4 flow information from routers, such as backbone router 1236-1, that peer with peer internet routers 1232-1, 1232-2, 1232-3 and pass the information to the logic algorithm module 1216 (operation 1408).

The logic algorithm module 1216 generates the data for view0 1304, view1 1312, view2 1320, view3 1328, and view4 1336 based on EA (embedded address), PSID (Port Set ID) bits, MAP prefixes per rule obtained from the Border Relay configuration collector 1208, and the like (operation 1412). The logic algorithm module 1216 obtains data of per host IP and filters IP flows data collected by the peering internet routers 1232-1, 1232-2, 1232-3 based on destination ipv4 addresses and destination port numbers (operation 1416). This information aids, for example, in forming view4 1336 for the per MAP customer flows coming from the internet. In addition, view2 1320 may be generated based on the data collected by the peering internet routers 1232-1, 1232-2, 1232-3, if available, for a customer with destination port numbers as per the Border Relay map rule assignments.

The following use cases illustrate non-limiting exemplary beneficial uses of the GUI 1228 of the network tool:

Use Case 1: MAP-T Troubleshooting

In one example embodiment, an operations engineer or other user accesses a "single pane of glass" of GUI 1228 via the MAP-T border relay controller 1204 to diagnose a connectivity issue of a MAP-T customer. The IP address allocated to the customer (along with additional MAP-T variables) are used to access a lower-level view of the customer allocated port ranges, representations of flows found on different devices of the network, and the like via view0 1304, view1 1312, view2 1320, view3 1328, and view4 1336. This information helps the operational engineer quickly find the point of failure (such as the CPE 106, the BR nodes 1212-1, 1212-2, 1212-3, 1212-4, the peering routers 1224-1, 1224-2, 1224-3, and the like), and resolve the issue by making, for example, configurational changes to the appropriate devices.

Figure 13A:
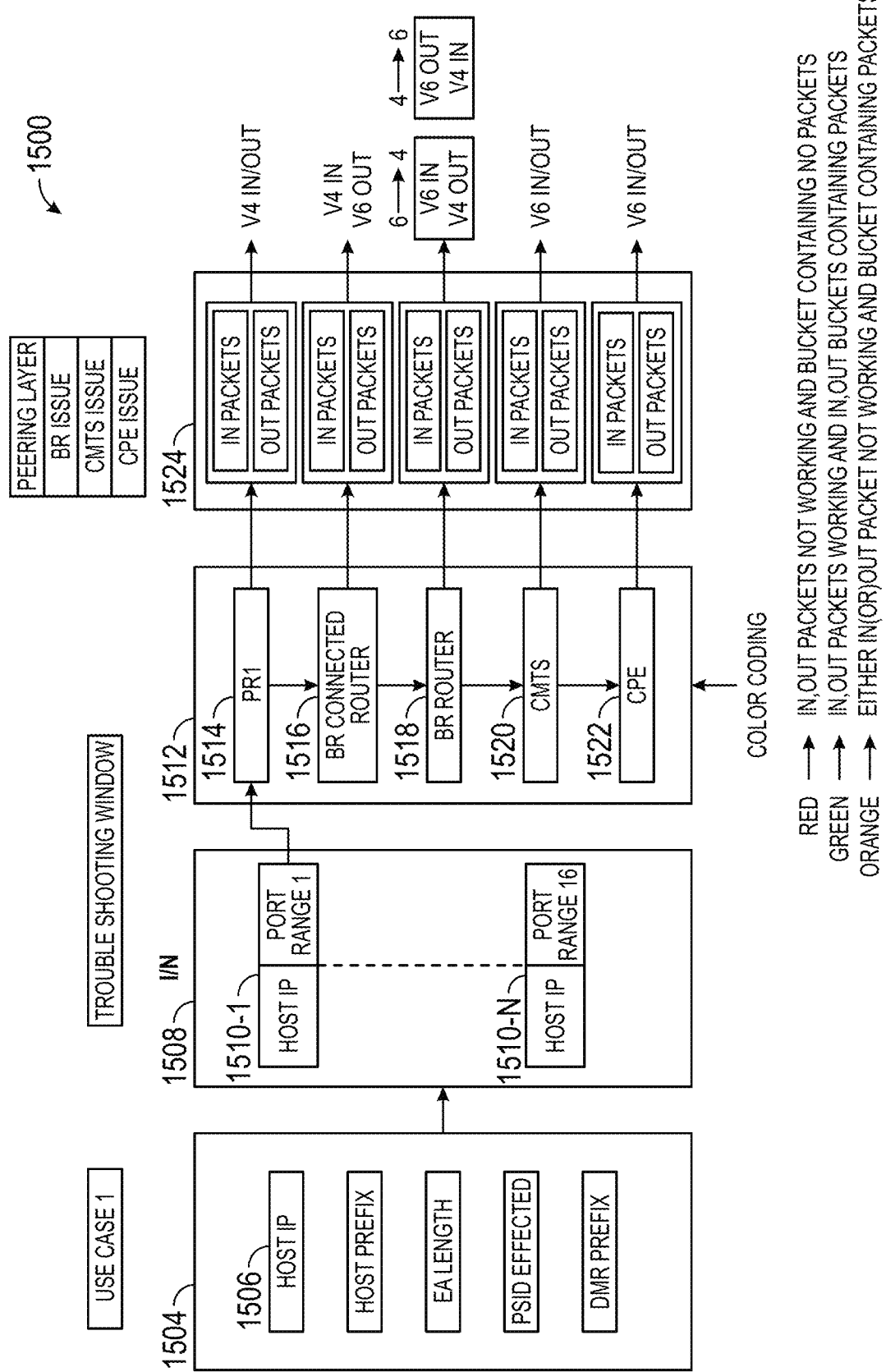
FIG. 13A is an illustration of an example troubleshooting window of the GUI, in accordance with an example embodiment.

FIG. 13A is an illustration of an example troubleshooting window 1500 of the GUI 1228, in accordance with an example embodiment. The troubleshooting window includes a high-level session view 1504, a host IP view 1508, a connectivity view 1512, and a connection status view 1524. The high-level session view 1504 displays basic parameters of an IP session, such as the host IP address 1506. Selection of the host IP address 1506 triggers display of the host IP view 1508, which displays the host IP addresses 1510-1, . . . , 1510-N associated with the host IP address 1506. Selection of the host IP address 1510-1 triggers display of the connectivity view 1512, which identifies the network devices associated with a session of the host IP address 1510-1. For example, the peering router 1224-3 is represented as PR1 1514, the router 1240-7 is represented as a BR-connected router 1516, the router 1240-8 is represented as a BR router 1518, the CMTS 1244-4 is represented as CMTS 1520, and CPE 1260-7 is represented as CPE 1522. The connection status view 1524 displays the headers of recent packets of the session of the host IP address 1510-1 processed by each of the peering router 1224-3, the router 1240-7, the router 1240-8, the CMTS 1244-4, and the CPE 1260-7. For each device, the connection status view 1524 displays the headers 1284, as described above in conjunction with FIG. 10A, of recent packets of the session of the host IP address 1510-1 for both the inbound and the outbound packets (from the perspective of the corresponding network device). In one example embodiment, the packet count is displayed in the connection status view 1524, in addition to or replacement of the headers 1284 of recent packets.

For example, v6 packets corresponding to host IP address 1510-1 may be collected between the CPE 1260-7 and the BR node 1212-4 and the corresponding v4 packets may be collected between the BR node 1212-4 and the peering router 1224-3. In addition to ordinary v6 packets, exceptional packets, such as fragmented packets, are supported and may be monitored to perform diagnostic tasks and to understand the different types of packets arriving from the Internet; this capability helps in understanding additional requirements that may be required for translation of exceptional packets by the MAP-T Border Relay platform. If the input queue of the CMTS 1244-4 contains packets, the output queue of the CPE 1260-7 contains packets, and the output queue of the border relay node 1212-4 is empty of packets (while the input queue contains packets), a potential failure, such as a configuration error, of the border relay node 1212-4 is indicated. For example, the border relay node 1212-4 may be missing a mapping rule; a rule to mitigate the anomaly may be either manually entered or the rule may be automatically configured. In one example embodiment, an interface of the GUI 1228 provides an icon for triggering the MAP-T border relay controller 1204 to reconfigure the border relay node 1212-4 via the border relay configuration collector 1208. The icon can be selected by a user to, for example, install a new rule on one of the border relay nodes 1212-1, 1212-2, 1212-3, 1212-4. This technique has the advantage of avoiding service personnel troubleshooting the customer premise equipment on-site.

Use Case 2: MAP-T Resource Management

In one example embodiment, an operations engineer or other user accesses the GUI 1228 provisioned via the logic algorithm module 1216 to explore and view the customer IP port utilization. For example, a user can search for the relevant host IP address via the GUI 1228. If the customer is exceeding the allocated number of source ports, the GUI 1228 will display an alert and assist the operations engineer in resolving or preventing a connection drop issue.

Figure 13B:
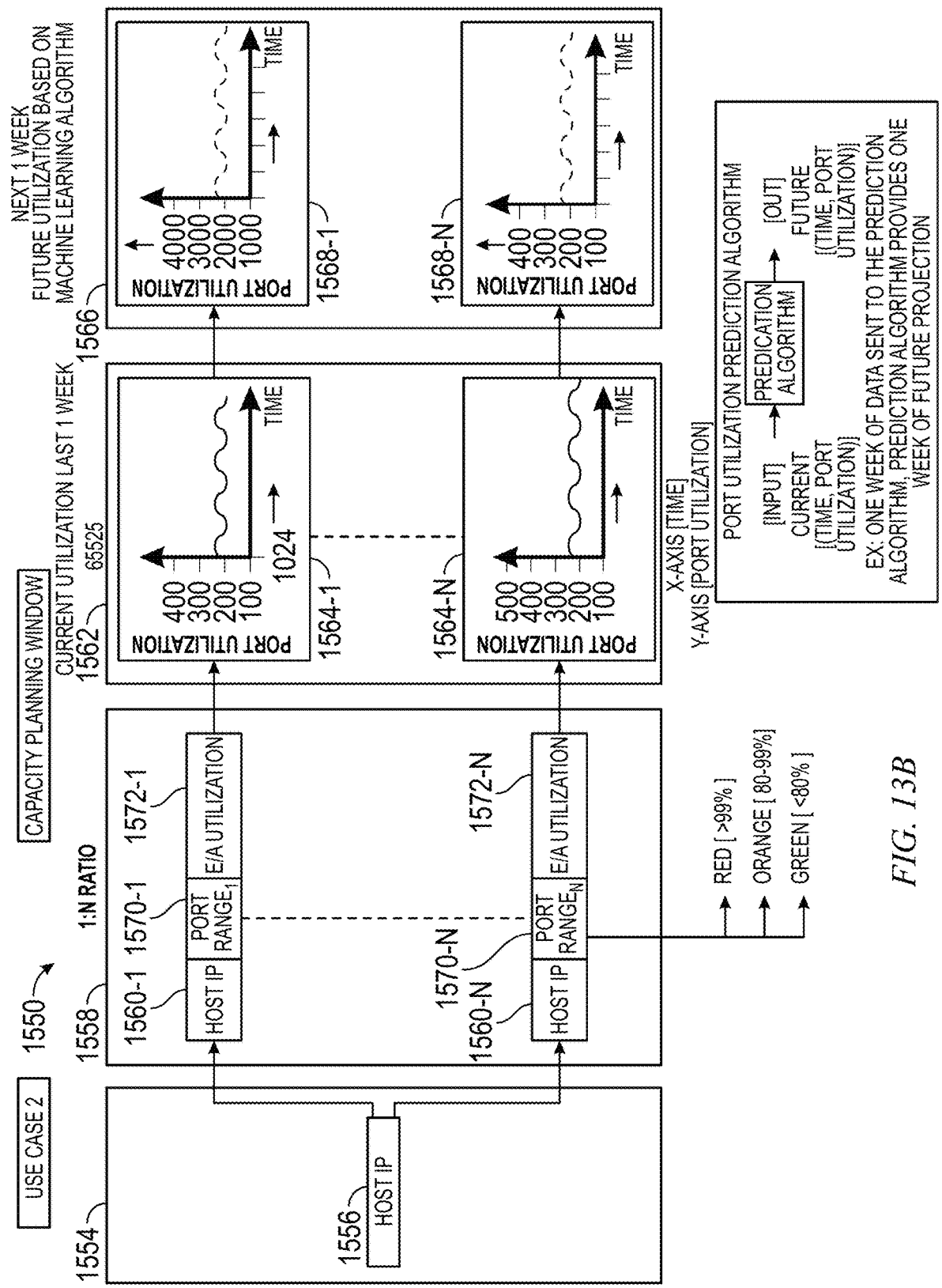
FIG. 13B is an illustration of an example capacity planning window of the GUI, in accordance with an example embodiment.

In one example embodiment, a machine learning prediction algorithm (such as a supervised machine learning algorithm 1252) is trained on historic port utilization information, current port utilization information, and the like to provide recommendations and/or execute capacity planning and the forecasting of future utilization of, for example, customer ports. FIG. 13B is an illustration of an example capacity planning window 1550 of the GUI 1228, in accordance with an example embodiment. The capacity planning window includes a high-level session view 1554, a host IP view 1558, a current port utilization view 1562, and a future port utilization view 1566. The high-level session view 1554 displays a host IP address 1556 being analyzed. Selection of the host IP address 1556 triggers display of the host IP view 1558, which displays the host IP addresses 1560-1, . . . , 1560-N associated with the host IP address 1556. The host IP view 1558 also displays the port range 1570-1, . . . , 1570-N assigned to the corresponding host IP address 1560-1, . . . , 1560-N and the utilization 1572-1, . . . , 1572-N of the ports within the port range. A current port utilization view 1562 displays a current port utilization graph 1564-1, . . . , 1564-N for each host IP address 1560-1, . . . , 1560-N. Based on the historic port utilization information, the machine learning prediction algorithm 1252 predicts future port utilizations; this is displayed in future port utilization graphs 1568-1, . . . , 1568-N of the future port utilization view 1566. Moreover, the future port utilization can be used to identify a future time period where the port utilization will exceed 100%, leading to the potential loss of network connections. Thus, in one example embodiment, additional ports may be allocated to a host IP address that is exceeding, or predicted to exceed, for example, 90% (or other preconfigured threshold) utilization.

Recapitulation

Given the discussion thus far, it will be appreciated that, in general terms, an exemplary method, according to an aspect of the invention, includes the operations of collecting, by a border relay configuration collector 1208, configuration and performance data from one or more MAP-T border relay nodes 1212-1, 1212-2, 1212-3, 1212-4 of a MAP-T network; collecting, by an IP flow data collector 1220, IP flow data across one or more Internet peering routers 1224-1, 1224-2, 1224-3 coupled to the MAP-T network; analyzing, by a logic algorithm module 1216, a network anomaly that impairs performance of the MAP-T network using the configuration and performance data collected by the border relay configuration collector 1208 and the IP flow data collector 1220; and reconfiguring a network translation capability of the MAP-T network based on the analysis of the network anomaly.

In one example embodiment, the configuration and performance data are collected based on MAP-T Domain rules, embedded addresses, and port-set identifier (PSID) information. In one example embodiment, per host source port utilization is determined, and the reconfiguring of the network translation capability is based on the determined per host source port utilization. In one example embodiment, IP flow data is collected from one or more backbone routers 1236-1, 1236-2, 1236-3, 1236-4, one or more routers 1240-1, 1240-2, 1240-3, 1240-4, 1240-5, 1240-6, 1240-7, 1240-8, and one or more MAP-T Border Relay (BR) nodes 1212-1, 1212-2, 1212-3, 1212-4, and the analyzing of the network anomaly is based on the collected IP flow data. In one example embodiment, collecting the IP flow data comprises collecting the IP flow data from Map-T customer equipment 1260-7, 1260-8 and a cable-modem termination system (CMTS) 1244-4. In one example embodiment, IPv4 utilization per prefix, IPv4 utilization per customer, and MAP-T host IP addresses with source port range information are determined, and the analyzing of the network anomaly is based on the determined IPv4 utilization per prefix, IPv4 utilization per customer, and MAP-T host IP addresses with source port range information.

In one example embodiment, a graphical user interface view view0 1304 is generated that displays a set of border relay icons 1308-1, . . . , 1308-N, where each border relay icon 1308-1, . . . , 1308-N represents a corresponding Border Relay node 1212-1, 1212-2, 1212-3, 1212-4; a graphical user interface view view1 1312 is generated that displays detailed border relay icons 1316-1, . . . , 1316-N that present the corresponding map relay rules 1344-1, 1344-2 for each Border Relay node 1212-1, 1212-2, 1212-3, 1212-4; and the reconfiguring the network translation capability of the MAP-T network is based on information displayed in the graphical user interface view view1 1312. In one example embodiment, the reconfiguring the network translation capability of the MAP-T network further comprises modifying the map relay rules 1344-1, 1344-2 of at least one Border Relay node 1212-1, 1212-2, 1212-3, 1212-4 to mitigate a connection failure based on the graphical user interface view view1 1312. In one example embodiment, a graphical user interface current port utilization view 1562 that displays a current port utilization graph 1564-1, . . . , 1564-N for each host IP address 1560-1, . . . , 1560-N and a graphical user interface future port utilization view 1566 that displays a future port utilization graph 1568-1, . . . , 1568-N are generated for each host IP address 1560-1, . . . , 1560-N; and the reconfiguring the network translation capability of the MAP-T network is based on information displayed in the graphical user interface current port utilization view 1562 and the graphical user interface future port utilization view 1566.

In one aspect, an exemplary method includes operations of collecting, by a border relay configuration collector 1208, configuration and performance data from one or more MAP-T border relay nodes 1212-1, 1212-2, 1212-3, 1212-4 of a MAP-T network; collecting, by an IP flow data collector 1220, IP flow data across one or more Internet peering routers 1224-1, 1224-2, 1224-3 coupled to the MAP-T network; determining, by a logic algorithm module 1216, an availability of network resources for the MAP-T network using the configuration and performance data collected by the border relay configuration collector 1208 and the IP flow data collector 1220, the network resources comprising one or more available port assignments corresponding to a given IP address; and reconfiguring a network translation capability of the MAP-T network based on the determined availability of network resources.

In one aspect, a system comprises a border relay configuration collector 1208 configured to collect configuration and performance data from one or more MAP-T border relay nodes 1212-1, 1212-2, 1212-3, 1212-4 of a MAP-T network; an IP flow data collector 1220 configured to collect IP flow data across one or more Internet peering routers 1224-1, 1224-2, 1224-3 coupled to the MAP-T network; a logic algorithm module 1216 coupled to the border relay configuration collector 1208 and the IP flow data collector 1220 and configured to analyze a network anomaly that impairs performance of the MAP-T network using the configuration and performance data collected by the border relay configuration collector 1208 and the IP flow data collector 1220; and a graphical user interface module 1228 coupled to the logic algorithm module and configured to receive instructions to reconfigure a network translation capability of the MAP-T network based on the analysis of the network anomaly.

In one aspect, a non-transitory computer readable medium comprises computer executable instructions which when executed by a computer cause the computer to perform the method of collecting, by a border relay configuration collector 1208, configuration and performance data from one or more MAP-T border relay nodes 1212-1, 1212-2, 1212-3, 1212-4 of a MAP-T network; collecting, by an IP flow data collector 1220, IP flow data across one or more Internet peering routers 1224-1, 1224-2, 1224-3 coupled to the MAP-T network; analyzing, by a logic algorithm module 1216, a network anomaly that impairs performance of the MAP-T network using the configuration and performance data collected by the border relay configuration collector 1208 and the IP flow data collector 1220; and reconfiguring a network translation capability of the MAP-T network based on the analysis of the network anomaly.

In one aspect, a non-transitory computer readable medium comprises computer executable instructions which when executed by a computer cause the computer to perform the method of collecting, by a border relay configuration collector 1208, configuration and performance data from one or more MAP-T border relay nodes 1212-1, 1212-2, 1212-3, 1212-4 of a MAP-T network; collecting, by an IP flow data collector 1220, IP flow data across one or more Internet peering routers 1224-1, 1224-2, 1224-3 coupled to the MAP-T network; determining, by a logic algorithm module 1216, an availability of network resources for the MAP-T network using the configuration and performance data collected by the border relay configuration collector 1208 and the IP flow data collector 1220, the network resources comprising one or more available port assignments corresponding to a given IP address; and reconfiguring a network translation capability of the MAP-T network based on the determined availability of network resources.

In a further aspect, an exemplary system includes a border relay configuration collector 1208 configured to collect configuration and performance data from one or more MAP-T border relay nodes 1212-1, 1212-2, 1212-3, 1212-4 of a MAP-T network; an IP flow data collector 1220 configured to collect IP flow data across one or more Internet peering routers 1224-1, 1224-2, 1224-3 coupled to the MAP-T network; and a logic algorithm module 1216 coupled to the border relay configuration collector 1208 and the IP flow data collector 1220 and configured to determine availability of network resources for the MAP-T network using the configuration and performance data collected by the border relay configuration collector 1208 and the IP flow data collector 1220. The network resources include one or more available port assignments corresponding to a given IP address. Also included is a graphical user interface module 1228 coupled to the logic algorithm module and configured to receive instructions to reconfigure a network translation capability of the MAP-T network based on the determined availability of network resources.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 7:
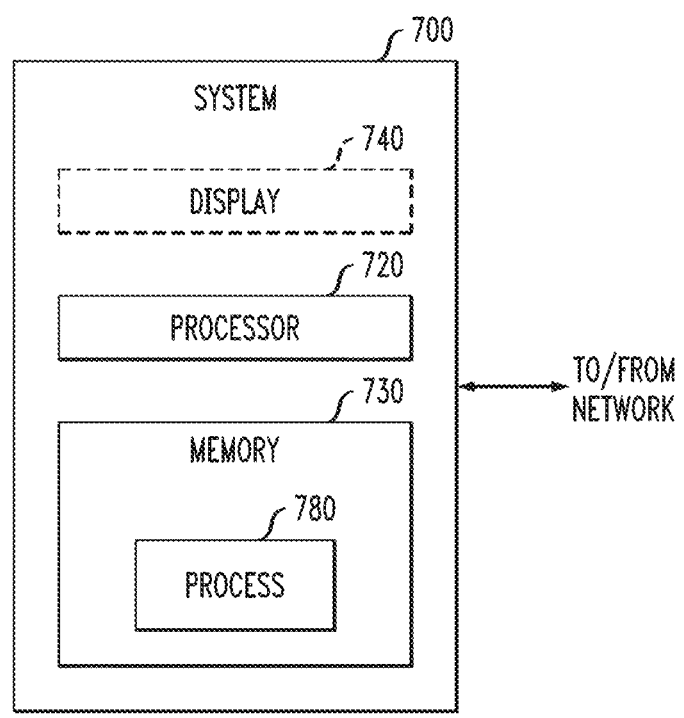
FIG. 7 is a block diagram of a computer system useful in connection with one or more aspects of the invention.

FIG. 7 is a block diagram of at least a portion of an exemplary system 600 that can be configured to implement at least some aspects of the invention, and is representative, for example, of one or more of the apparatus or modules shown in the figures. As shown in FIG. 7, memory 630 configures the processor 620 to implement one or more methods, steps, and functions (collectively, shown as process 650 in FIG. 7). The memory 630 could be distributed or local and the processor 620 could be distributed or singular. Different steps could be carried out by different processors, either concurrently (i.e., in parallel) or sequentially (i.e., in series).

The memory 630 could be implemented as an electrical, magnetic or optical memory, or any combination of these or other types of storage devices. It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware. Display 640 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   collecting, by a border relay configuration collector, configuration and performance data from one or more MAP-T border relay nodes of a MAP-T network;
   collecting, by an IP flow data collector, IP flow data across one or more Internet peering routers coupled to the MAP-T network;
   analyzing, by a logic algorithm module, a network anomaly that impairs performance of the MAP-T network using the configuration and performance data collected by the border relay configuration collector and the IP flow data collector; and
   reconfiguring a network translation capability of the MAP-T network based on the analysis of the network anomaly.

2. The method of claim 1, wherein the configuration and performance data is collected based on MAP-T Domain rules, embedded addresses, and port-set identifier (PSID) information.

3. The method of claim 1, further comprising determining per host source port utilization, wherein the reconfiguring of the network translation capability is based on the determined per host source port utilization.

4. The method of claim 1, further comprising collecting IP flow data from one or more backbone routers, one or more routers, and one or more MAP-T Border Relay (BR) nodes, wherein the analyzing of the network anomaly is based on the collected IP flow data.

5. The method of claim 1, wherein collecting the IP flow data comprises collecting the IP flow data from Map-T customer equipment and a cable-modem termination system (CMTS).

6. The method of claim 1, further comprising determining IPv4 utilization per prefix, IPv4 utilization per customer, and MAP-T host IP addresses with source port range information, and wherein the analyzing of the network anomaly is based on the determined IPv4 utilization per prefix, the IPv4 utilization per customer, and the MAP-T host IP addresses with source port range information.

7. The method of claim 1, further comprising generating a graphical user interface view view0 that displays a set of border relay icons, where each border relay icon represents a corresponding Border Relay node; generating a graphical user interface view view1 that displays detailed border relay icons that present the corresponding map relay rules for each Border Relay node; and wherein the reconfiguring the network translation capability of the MAP-T network is based on information displayed in the graphical user interface view view1.

8. The method of claim 7, wherein the reconfiguring the network translation capability of the MAP-T network further comprises modifying the map relay rules of at least one Border Relay node to mitigate a connection failure based on the graphical user interface view view1.

9. The method of claim 1, further comprising generating a graphical user interface current port utilization view that displays a current port utilization graph for each host IP address and a graphical user interface future port utilization view that displays a future port utilization graph for each host IP address; and wherein the reconfiguring the network translation capability of the MAP-T network is based on information displayed in the graphical user interface current port utilization view and the graphical user interface future port utilization view.

10. A method comprising:
    collecting, by a border relay configuration collector, configuration and performance data from one or more MAP-T border relay nodes of a MAP-T network;
    collecting, by an IP flow data collector, IP flow data across one or more Internet peering routers coupled to the MAP-T network;
    determining, by a logic algorithm module, an availability of network resources for the MAP-T network using the configuration and performance data collected by the border relay configuration collector and the IP flow data collector, the network resources comprising one or more available port assignments corresponding to a given IP address; and
    reconfiguring a network translation capability of the MAP-T network based on the determined availability of network resources.

11. The method of claim 10, further comprising performing machine learning based on historic port utilization information to predict the future port utilizations for one or more host IP addresses, wherein the reconfiguring of the network translation capability is further based on the future port utilizations.

12. The method of claim 11, wherein the reconfiguring the network translation capability of the MAP-T network further comprises assigning additional source ports to the given IP address based on the predicted future port utilizations to prevent a connection failure due to overutilization of assigned source ports.

13. The method of claim 10, wherein the reconfiguring of the network translation capability comprises assigning additional source ports to the given IP address based on the current port utilizations to prevent a connection failure due to overutilization of assigned source ports.

14. The method of claim 10, wherein the configuration and performance data is collected based on MAP-T Domain rules, embedded addresses, and port-set identifier (PSID) information.

15. The method of claim 10, further comprising determining per host source port utilization, wherein the reconfiguring of the network translation capability is based on the determined per host source port utilization.

16. The method of claim 10, further comprising collecting IP flow data from one or more backbone routers, one or more routers, and one or more MAP-T Border Relay (BR) nodes, wherein the analyzing of the network anomaly is based on the collected IP flow data.

17. The method of claim 10, wherein collecting the IP flow data comprises collecting the IP flow data from Map-T customer equipment and a cable-modem termination system (CMTS).

18. The method of claim 10, further comprising determining IPv4 utilization per prefix, IPv4 utilization per customer, and MAP-T host IP addresses with source port range information, and wherein the determining the availability of network resources for the MAP-T network is based on the determined IPv4 utilization per prefix, the IPv4 utilization per customer, and the MAP-T host IP addresses with source port range information.

19. The method of claim 10, further comprising generating a graphical user interface view view0 that displays a set of border relay icons, where each border relay icon represents a corresponding Border Relay node; generating a graphical user interface view view1 that displays detailed border relay icons that present the corresponding map relay rules for each Border Relay node; and wherein the reconfiguring the network translation capability of the MAP-T network is based on information displayed in the graphical user interface view view1.

20. The method of claim 19, wherein the reconfiguring the network translation capability of the MAP-T network further comprises modifying the map relay rules of at least one Border Relay node to mitigate a connection failure based on the graphical user interface view view1.

21. The method of claim 10, further comprising generating a graphical user interface current port utilization view that displays a current port utilization graph for each host IP address and a graphical user interface future port utilization view that displays a future port utilization graph for each host IP address; and wherein the reconfiguring the network translation capability of the MAP-T network is based on information displayed in the graphical user interface current port utilization view and the graphical user interface future port utilization view.

22. A system comprising:
a border relay configuration collector configured to collect configuration and performance data from one or more MAP-T border relay nodes of a MAP-T network;
an IP flow data collector configured to collect IP flow data across one or more Internet peering routers coupled to the MAP-T network;
a logic algorithm module coupled to the border relay configuration collector and the IP flow data collector and configured to analyze a network anomaly that impairs performance of the MAP-T network using the configuration and performance data collected by the border relay configuration collector and the IP flow data collector; and
a graphical user interface module coupled to the logic algorithm module and configured to receive instructions to reconfigure a network translation capability of the MAP-T network based on the analysis of the network anomaly.

23. A non-transitory computer readable medium comprising computer executable instructions which when executed by a computer cause the computer to perform the method of:
collecting, by a border relay configuration collector, configuration and performance data from one or more MAP-T border relay nodes of a MAP-T network;
collecting, by an IP flow data collector, IP flow data across one or more Internet peering routers coupled to the MAP-T network;
analyzing, using a logic algorithm module, a network anomaly that impairs performance of the MAP-T network using the configuration and performance data collected by the border relay configuration collector and the IP flow data collector; and
reconfiguring a network translation capability of the MAP-T network based on the analysis of the network anomaly.

24. A non-transitory computer readable medium comprising computer executable instructions which when executed by a computer cause the computer to perform the method of:
collecting, by a border relay configuration collector, configuration and performance data from one or more MAP-T border relay nodes of a MAP-T network;
collecting, by an IP flow data collector, IP flow data across one or more Internet peering routers coupled to the MAP-T network;
determining, by the logic algorithm module, an availability of network resources for the MAP-T network using the configuration and performance data collected by the border relay configuration collector and the IP flow data collector, the network resources comprising one or more available port assignments corresponding to a given IP address; and
reconfiguring a network translation capability of the MAP-T network based on the determined availability of network resources.

25. A system comprising:
a border relay configuration collector configured to collect configuration and performance data from one or more MAP-T border relay nodes of a MAP-T network;
an IP flow data collector configured to collect IP flow data across one or more Internet peering routers coupled to the MAP-T network;
a logic algorithm module coupled to the border relay configuration collector and the IP flow data collector and configured to determine availability of network resources for the MAP-T network using the configuration and performance data collected by the border relay configuration collector and the IP flow data collector, the network resources comprising one or more available port assignments corresponding to a given IP address; and
a graphical user interface module coupled to the logic algorithm module and configured to receive instructions to reconfigure a network translation capability of the MAP-T network based on the determined availability of network resources.

* * * * *